United States Patent
Gentile et al.

(10) Patent No.: US 7,877,340 B2
(45) Date of Patent: Jan. 25, 2011

(54) SYSTEM AND METHOD FOR RESOLVING GAMMA-RAY SPECTRA

(75) Inventors: Charles A. Gentile, Plainsboro, NJ (US); Jason Perry, Princeton, NJ (US); Stephen W. Langish, Eastampton, NJ (US); Kenneth Silber, Hopewell, NJ (US); William M. Davis, East Windsor, NJ (US); Dana Mastrovito, Yardley, PA (US)

(73) Assignee: Princeton University, Princeton, NJ (US)

( * ) Notice: Subject to any disclaimer, the term of this patent is extended or adjusted under 35 U.S.C. 154(b) by 0 days.

(21) Appl. No.: 12/761,717

(22) Filed: Apr. 16, 2010

(65) Prior Publication Data

US 2010/0280980 A1    Nov. 4, 2010

Related U.S. Application Data

(63) Continuation of application No. 11/743,421, filed on May 2, 2007, now Pat. No. 7,711,661.

(60) Provisional application No. 60/796,976, filed on May 2, 2006.

(51) Int. Cl.
*G06E 1/00* (2006.01)
*G06E 3/00* (2006.01)
*G06F 15/18* (2006.01)
*G06F 7/00* (2006.01)
*G01J 1/42* (2006.01)
*G01T 1/00* (2006.01)

(52) U.S. Cl. .................................. 706/16; 250/394
(58) Field of Classification Search .................. 706/12, 706/16; 250/394

See application file for complete search history.

(56) References Cited

U.S. PATENT DOCUMENTS

| | | | | |
|---|---|---|---|---|
| 4,862,004 | A * | 8/1989 | Koike et al. | 250/369 |
| 5,602,886 | A * | 2/1997 | Gross et al. | 376/253 |
| 7,485,877 | B2 * | 2/2009 | Kearfott | 250/484.2 |
| 2006/0284094 | A1 * | 12/2006 | Inbar | 250/359.1 |

* cited by examiner

*Primary Examiner*—Michael B. Holmes
*Assistant Examiner*—Vincent M Gonzales
(74) *Attorney, Agent, or Firm*—Drinker, Biddle & Reath, LLP

(57) ABSTRACT

A system for identifying radionuclide emissions is described. The system includes at least one processor for processing output signals from a radionuclide detecting device, at least one training algorithm run by the at least one processor for analyzing data derived from at least one set of known sample data from the output signals, at least one classification algorithm derived from the training algorithm for classifying unknown sample data, wherein the at least one training algorithm analyzes the at least one sample data set to derive at least one rule used by said classification algorithm for identifying at least one radionuclide emission detected by the detecting device.

2 Claims, 17 Drawing Sheets

Cs137 FOUND!!

Threat Level = HIGH

Cs137 Half-life of 30.0 years

Dec 07 14:26:15

FIG. 9

Am241 FOUND!!

Threat Level = MEDIUM

Am241 Half-life of 432.7 years

Dec 07 14:23:48

FIG. 10

Co60 FOUND!!

Threat Level = HIGH

Co60 Half-life of 5.3 years

Dec 07 14:27:56

FIG. 11

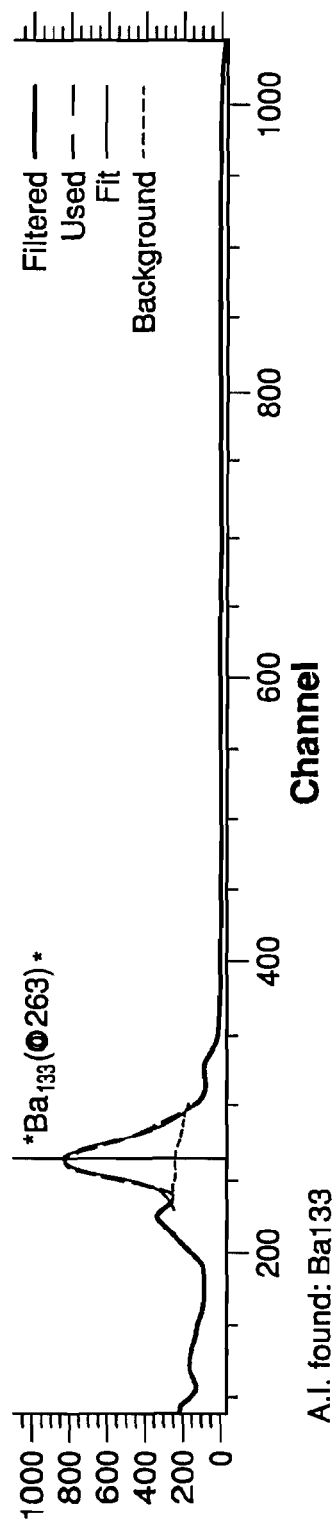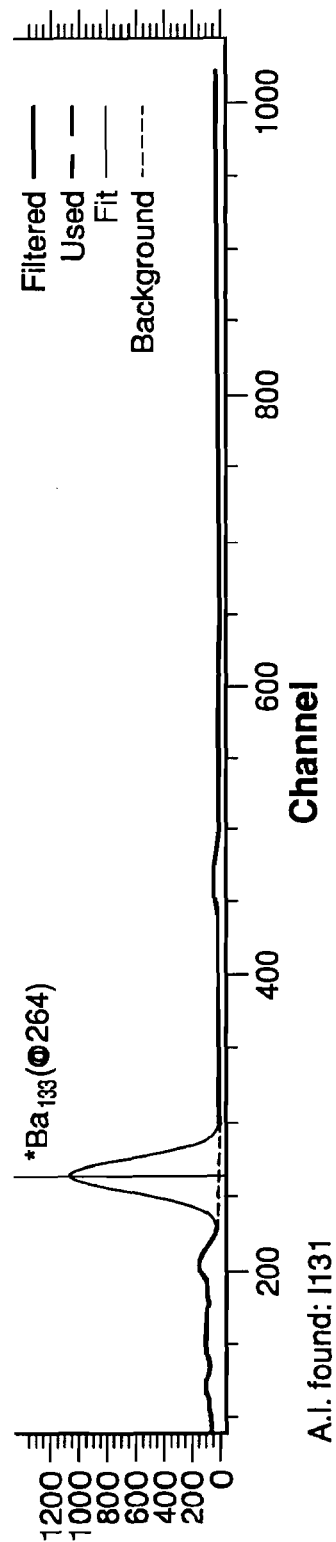

SYSTEM AND METHOD FOR RESOLVING GAMMA-RAY SPECTRA

PRIORITY INFORMATION

This application is a continuation of U.S. patent application Ser. No. 11/743,421 now U.S. Pat. No. 7,711,661, filed May 2, 2007, entitled "System and Method for Resolving Gamma Ray Spectra", and further claims the benefit of U.S. patent application Ser. No. 11/017,215, entitled "Radionuclide Detector and Software For Controlling Same"; and further claims the benefit of U.S. Provisional Application Ser. No. 60/796,976, entitled "Algorithms for Resolving Gamma-Ray Spectra", filed May 2, 2006, the disclosures of which are incorporated herein as if set forth in their entireties.

GOVERNMENT INTERESTS

The inventions described herein have been developed for, pursuant to, or with the assistance of, the United States government. These inventions may be manufactured, used and licensed by or for the United States government for United States government purposes.

FIELD OF THE INVENTION

The present invention is directed to the detection and identification of radionuclides, and, more specifically, to a system, method and apparatus for the detection and identification of radionuclides via spectral analysis.

BACKGROUND

A gamma ray is a high-energy electromagnetic emission by certain radionuclides when the state of those certain radionuclei transitions from a higher to a lower energy state. Gamma rays have high energy and a short wave length, with energies above 1 million eV and wavelengths less than 0.001 nanometers. All gamma rays emitted from a given isotope have the same energy, which has historically enabled scientists to identify which gamma emitters are present in an unknown sample.

Gamma rays, as well as protons, alpha particles, beta particles and x-rays, may cause direct ionization in that these particles or rays transfer at least a portion of the energy thereof upon interaction with matter. This transfer generally occurs by imparting energy to electrons of atoms that have been interacted with. Generally speaking, these ions may be measured by using measuring devices, such as a Geiger counter, for example.

While beta and alpha particles each have mass and charge, and are natural products of the decay of, for example, uranium, radium, polonium, and many other elements, gamma and x-rays have no mass and no electrical charge. Each is thus pure electromagnetic energy.

Most gamma and x-rays can easily travel several meters through the air and penetrate several centimeters of human tissue. Some emissions have enough energy to pass through the body, exposing all the organs to radiation. Gamma emitting radionuclides do not have to enter the body to be a hazard, as direct external and internal exposure to gamma rays or X-rays are of concern.

A large portion of received gamma radiation largely passes through the body without interacting with tissue, as the body is mostly empty space at the atomic level, and gamma rays are atomically small in size. By contrast, alpha and beta particles inside the body lose all their energy by colliding with tissue and causing damage. X-rays may act in a manner similar to alpha and beta particles, but with slightly lower energy.

Gamma rays do not directly ionize atoms in tissue. Instead, they transfer energy to atomic particles such as electrons (which are essentially the same as beta particles). These energized particles then interact with human tissue to form ions, in the same way radionuclide-emitted alpha and beta particles would. However, because gamma rays have more penetrating energy than alpha and beta particles, the indirect ionizations they cause generally occur further away from the emission source, and consequently, deeper into human tissue. Sources of gamma rays typically include radioactive elements such as Thulium 170, Iridium 192, Cesium 137, and Cobalt 60, while sources of x-rays typically include x-ray tubes within the controlled environment of a medical office.

While there are many beneficial uses for radioactive materials in the fields of science and medicine, these materials may be highly threatening to society. It goes without saying, radiation poisoning may be a tactic of terrorist groups and other radical factions with the intent to bring harm or even death to others. For example, the use of "dirty bombs", which add radioactive materials to common explosives, has been well documented. Other possibilities, such as the contamination of food stocks or water sources with radioactive materials, have also been speculated.

The U.S. government does not take these sorts of potential threats lightly. For example, risk priority matrices set forth by the U.S. government include Cs 137 and Co 60, because of the large quantities of these isotopes that exist and, in the case of Cs 137, the ease of dispersal. Sr 90, Pu 238, Am 241 and Ir 192 are also included in the matrix of potential threats. In addition, spent fuel is generally included in potential threat matrices, and needless to say there are very significant quantities of spent fuel available.

Because nuclear devices or threats such as those described above may be assembled or deployed at any location, it would be advantageous for authorities to have the capability of sensing radionuclides at widely dispersed locations. By way of nonlimiting examples, such locations may include automotive highways, bridges, airports, train stations, municipal mass transit systems, governmental buildings, freight handling facilities, and the like. Automating the screening or sensing at such sites may enable the screening at those sites to be free of human intervention when no radionuclides are detected, and yet may readily enable the alerting of appropriate authorities upon a positive detection and/or identification of a specific radionuclide deemed to be a threat.

To date, there are several types of decectors, each having varying degrees of resolution and performance. For example, the differences in performance characteristics of sodium iodide (NaI) versus Germanium for gamma ray spectroscopy have been well characterized. However, the increased resolution of germanium detectors, obvious upon visual inspection of the spectra, can be illusive when evaluating the advantages for systems that might automatically identify radionuclides within spectra. Many gamma spectroscopy based sensors have and will be deployed as standalone, automated surveillance/detection systems, a reality that places the performance and reliability of automatic radionuclide identification systems at central and increasing importance.

Traditional automated, peak-fitting algorithms for identifying radionuclides in gamma-ray spectra may work in a very similar manner to that of the human eye in determining specific radionuclides. When employing these conventional tools, nuclear spectroscopy data derived from scintillators may often prove to be indeterminate as to the identification of originating specie. The problem of identifying embedded spectra, while difficult for the unaided eye and corollary conventional algorithms, is subject to acceptable resolution when it is addressed with more sophisticated algorithm based systems.

Thus, there remains a need for automated systems and methods to detect and identify any of a wide range of radionuclides from complex or "noisy" spectral data in a cost-effective manner.

SUMMARY OF THE INVENTION

A system for identifying radionuclide emissions is described. The system includes at least one processor for processing output signals from a radionuclide detecting device, at least one training algorithm run by the at least one processor for analyzing data derived from at least one set of known sample data from the output signals, at least one classification algorithm derived from the training algorithm for classifying unknown sample data, wherein the at least one training algorithm analyzes the at least one sample data set to derive at least one rule used by said classification algorithm for identifying at least one radionuclide emission detected by the detecting device.

DESCRIPTION OF THE DRAWINGS

Understanding of the present invention will be facilitated by consideration of the following detailed description of the embodiments of the present invention taken in conjunction with the accompanying drawings, in which like numerals refer to like parts and in which:

FIG. 9 shows a screen shot of the alert for Cs137 according to an aspect of the present invention;

FIG. 10 shows a screen shot of the alert for Am241 according to an aspect of the present invention;

FIG. 11 shows a screen shot of the alert for Co60 according to an aspect of the present invention;

FIG. 14 is a graph of generated test spectra for Ba-133;

FIG. 15 is a graph of generated test spectra for I-131;

DETAILED DESCRIPTION OF THE PREFERRED EMBODIMENTS

Figure 1:
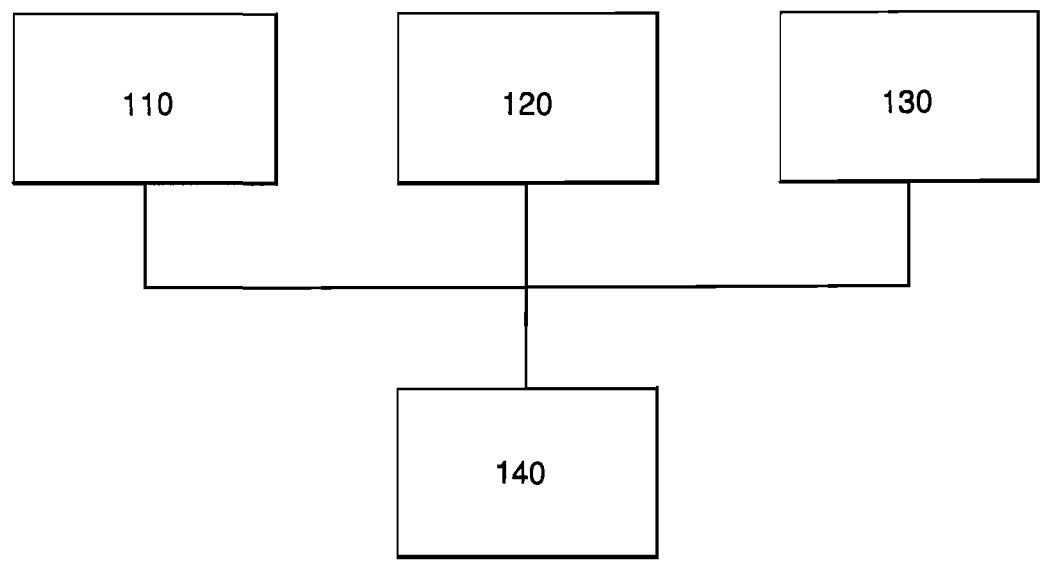
FIG. 1 illustrates a block diagram of the system according to an aspect of the present invention.

It is to be understood that the figures and descriptions of the present invention have been simplified to illustrate elements that are relevant for a clear understanding of the present invention, while eliminating, for the purpose of clarity, many other elements found in typical detection components and methods of manufacturing and using the same. Those of ordinary skill in the art will recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to such elements and methods known to those skilled in the art.

The present invention is directed to a system and method for identifying radionuclides from spectra data in radionuclide detectors. The invention may include a device and system suitable for recognizing unique radiant energy emission levels or patterns for a radionuclide, for one or more selected from a selected set of radionuclides, or for an unknown sample. According to an aspect of the present invention, the device and system may allow for detection of radionuclides having minimal and trace emission levels. According to an aspect of the present invention, the invention may include communicating not only the presence, but also the identity, of a radionuclide in a sample volume to appropriate personnel at a local or remote location. The invention may include a plurality of methods for accomplishing these detections, identifications, and communications of the device and system, as further described below.

The present invention may detect trace, as well as high level, emissions, at low to very high rates or frequencies. This may allow the device to be installed in virtually any location, especially those locations or facilities where there is a high volume of public traffic, which traffic may be traveling at virtually any rate of speed, or any other locations at or through which there may be a heightened likelihood of the transport of hidden radionuclides. By way of nonlimiting example, these locations may include highways, train stations, airports, shipyards, metropolitan mass transit systems, governmental and commercial buildings, truck terminals, railroad freight handling facilities, and the like.

The present invention may include an alerting function or similar notification of a positive detection of a suspect radionuclide, and an identification of a suspect radionuclide. The suspect radionuclide to be detected may be from a predetermined sample. These capabilities permit assessing the presence of radionuclides from a local or a remote location in real time. For example, the present invention may be installed at a shipping terminal in such a way that shipping containers may pass directly before, or under, one or more detector modules as the containers are offloaded from a vessel. If no emissions are detected, the shipyard tasks carry on without interruption. However, if emissions from a radionuclide are detected, an electronic warning system, such as a warning light, sound, and/or triggering of a portable alarm device carried by a security officer may be activated as the detection occurs, and this warning system may, dependently upon the type of radionuclide emission detected, identify the radionuclide and even the amount of the radionuclide detected, thereby allowing appropriate personnel to evaluate the situation.

The present invention may be used to scan vehicles, cargo containers, and other potential mobile targets, as well as stationary targets, and may provide substantially real-time detections and identifications of gamma emission, and real-time detections of the presence of x-ray or neutrons emissions. Further, because of the identifying nature, rather than solely a detecting nature, of the present invention, benign signatures, such as medical and industrial nuclear signatures, may be separated from suspect signatures as desired, thereby eliminating "false positive" readings that have historically been detrimental to radionuclide alert systems. The present invention is directed to a device, system, and method for detection of gamma, x-ray, and neutron emissions, and software for controlling and enhancing the detection and identification of such emissions. The device and system may include low level detection and integration in a small package. Additionally, while the discussion of the present invention includes elements that may be proximately located to the source of the signals, portions of the device may be located centrally or remotely. The present invention may detect radiation generally, and may detect all or some of the three types of emission discussed herein. According to an aspect of the present invention, the device may be passive.

The present invention may also detect the presence of at least trace amounts of emissions at high rates, or across short accumulation times, permitting use in sensitive and fast moving environments. For example, the present invention may be positioned over a bridge, such that detection of vehicles passing over the bridge may be made. In the event two fast moving vehicles are transporting radionuclides in succession, the device may recognize that two emissions sources are present, and not simply one. This high rate of detection is critical in the above scenario, as the first vehicle could be transporting radionuclides commonly used for medical purposes, while the second vehicle could be carrying radionuclides for terrorist activities. Using again the example of two vehicles crossing a bridge, when the first vehicle contains a very high level of emissions, and the second vehicle contains a trace level of emissions, the detector may recognize that two sources of emissions exist and not one. Thus, the detection and identification of radionuclides at high rates and high sensitivity levels allows for communication of a positive determination of the correct number of emissions sources to appropriate authorities. Further, the use of multiple detector/identifiers in accordance with the present invention may allow for an assessment of distances or amounts of a radionuclide(s) detected and identified, even in high rate or high frequency applications.

Referring now to FIG. 1, there is shown a block diagram of the system according to an aspect of the present invention. As may be seen in FIG. 1, system 100 may include a first detection channel 110, a second detection channel 120, a third detection channel 130 and processing 140 coupled to each of the channels for interpreting and analyzing the data from each channel. Each channel may be designed to detect signals of interest, commonly referred to throughout this discussion as "emissions", such as gamma rays, x-rays and neutrons, for example. Other types of channels or combinations of channels may be utilized to detect additional emissions (such as alpha and beta particles), and the number of channels may be greater than or less than three. For the sake of the present discussion of exemplary embodiment(s), three channels will be discussed with regard to detection of gamma rays, x-rays and neutrons, by way of non-limiting example only.

According to an aspect of the present invention, first detection channel 110 may be designed to detect the presence of neutron radiation. Neutron radiation consists of free neutrons. As may be known to those possessing an ordinary skill in the pertinent arts, neutrons may be emitted during nuclear fission, nuclear fusion or from certain other reactions, such as when a beryllium nucleus absorbs an alpha particle and emits a neutron, for example.

Neutron radiation is a form of ionizing radiation that is more penetrating than alpha, beta or gamma radiation. In health physics it is considered a fourth radiation hazard alongside these other types of radiation. Another, sometimes more severe, hazard of neutron radiation is its ability to induce radioactivity in most substances it encounters, including body tissues and instruments. This induced radiation may occur through the capture of neutrons by atomic nuclei. This process may typically account for much of the radioactive material released by the detonation of a nuclear weapon. This process may also present a problem in nuclear fission and nuclear fusion installations, as it may gradually render the equipment radioactive. The neutrons in reactors are generally categorized as slow (thermal) neutrons or fast neutrons, depending on their energy. Thermal neutrons are easily captured by atomic nuclei and are the primary means by which elements undergo atomic transmutation. Fast neutrons are produced by fission and fusion reactions, and have a much higher kinetic energy.

Figure 2:
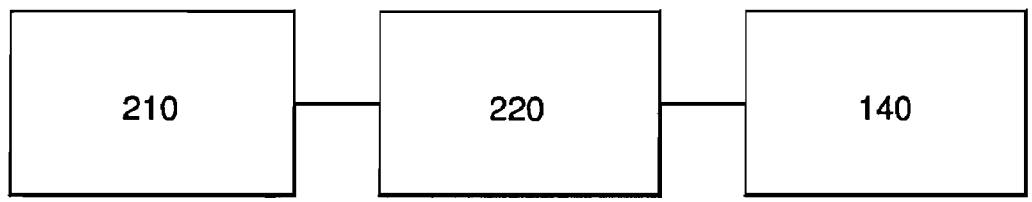
FIG. 2 illustrates a block diagram of a neutron detector according to the present invention.

According to an aspect of the present invention, a neutron detector may be utilized to detect neutron radiation. Referring now also to FIG. 2, there is shown block diagram of a neutron detector 200 according to the present invention. As may be seen in FIG. 2, neutron detector 200 may include a confined element 210, wherein the confined element is suitable for reacting with neutrons, and a converter 220. Confined element 210 may take the form of a pressurized tube or rod of a gas, such as He3 or BF3, for example. Confined element 210 may be confined at an elevated pressure in the range of 5-60 atm in order to increase the resulting signal level of an incident neutron. More specifically, a pressure range from 35-45 atm may be used. Yet more specifically, a pressure level of 40 atm may be utilized. Increased pressures may provide increased signal strength resulting from the detector in response to incident neutrons. Increased pressures may also increase the background level, so a balance between background detection sensitivity may be performed.

While a liquid or a solid may also be used within the confined element, a gas may be used since the ionized particles of a gas travel more freely than those of a liquid or a solid. Typical gases used in detectors include argon and helium, although boron-triflouride may be utilized.

A central electrode, or anode, may collect negative charges within the detector. The anode may be insulated from the chamber walls of the detector and the cathode of the detector, which cathode collects positive charges. A voltage may be applied to the anode and the chamber walls. A resistor may be shunted by a parallel capacitor, so that the anode is at a positive voltage with respect to the detector wall. Thereby, as a charged particle passes through the gas-filled chamber, the charged particle may ionize some of the gas along its path of travel. The positive anode may attract the electrons, or negative particles. The detector wall, or cathode, may attract the positive charges. Collecting these charges may reduce the voltage across the capacitor, which may cause an electrical pulse across the resistor that may be recorded by an electronic circuit. The voltage applied to the anode and cathode may directly determine the electric field and its strength.

After a neutron interacts with element 210, a conversion in the neutron energy occurs and a photon or electron may be produced. Converter 220 may be utilized to detect the presence of a photon or electron. Converter 220 may take the form of a conventional detector used for detecting incident photons or electrons and converting detected particles into commensurate electrical signals. For example, if a photon is produced by the interaction of the incident neutron and confined elements 210, converter 220 may be utilized to detect the presence of the produced photon. Converter 220 may convert the produced photon or electron into an electrical signal. The electrical signal may be filtered and amplified as would be evident to those possessing an ordinary skill in the pertinent arts. The electrical signal may be read into a processor, such as a computer, such as by utilizing a channel on a multi-channel analyzer.

Figure 3:
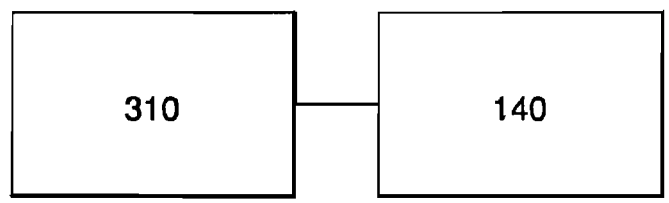
FIG. 3 illustrates a block diagram of an x-ray detector according to an aspect of the present invention.

According to an aspect of the present invention, second detection channel 120 may be designed to detect the presence of x-ray radiation. Referring also now to FIG. 3, there is shown a block diagram of the x-ray detector 300 designed for detection of x-ray radiation according to an aspect of the present invention. Detector 300 may include a converter 310. Converter 310 may take the form of a detector suitable for detecting x-rays by converting x-rays into an electrical signal. The electrical signal may be read into a processor, such as a computer, utilizing a channel on a multi-channel analyzer. By way of a nonlimiting example, converter 310 may take the form of a CdTe detector.

In addition to detecting produced x-rays, detection of x-rays may be increasingly useful because of the bremsstrahlung, or secondary, x-ray affect. Bremsstrahlung, or braking radiation, is electromagnetic radiation with a continuous spectrum produced by the acceleration of a charged particle, such as an electron, proton, alpha or beta particle, when deflected by another charged particle, such as an atomic nucleus. Two classes of bremsstrahlung radiation exist. Outer bremsstrahlung radiation occurs where the energy loss by radiation greatly exceeds that by ionization as a stopping mechanism in matter, such as for electrons with energies above 50 MeV. Inner bremsstrahlung occurs, infrequently, from the radiation emission during beta decay, resulting in the emission of a photon of energy less than or equal to the maximum energy available in the nuclear transition. Inner bremsstrahlung may be caused by the abrupt change in the electric field in the region of the nucleus of the atom undergoing decay, in a manner similar to that which causes outer bremsstrahlung. In electron and positron emission, the photon's energy comes from the electron/neutron pair, with the spectrum of the bremsstrahlung decreasing continuously with increasing energy of the beta particle. In electron capture, the energy comes at the expense of the neutrino, and the spectrum is greatest at about one third of the normal neutrino energy, reaching zero at zero energy and at normal neutrino energy.

Bremsstrahlung is thus a type of secondary radiation that it is produced as a reaction in shielding material caused by the primary radiation. In some cases the bremsstrahlung produced by some sources of radiation interacting with some types of radiation shielding may be more harmful than the original beta particles would have been.

Detector 300 may be suitable for detecting radioactive material that is shielded within a metal. For example, as may be known to those possessing an ordinary skill in the pertinent arts, an alpha particle incident on a metal may produce an x-ray. Elements hidden within protective metal shields may emit alpha particles that impinge on the metal shield. The present device may detect this type of x-ray emission and by so doing detects the presence of elements producing alpha (or beta) particles. In particular, shielded elements which may produce such x-ray emission may include those with a long half-life.

Figure 4:
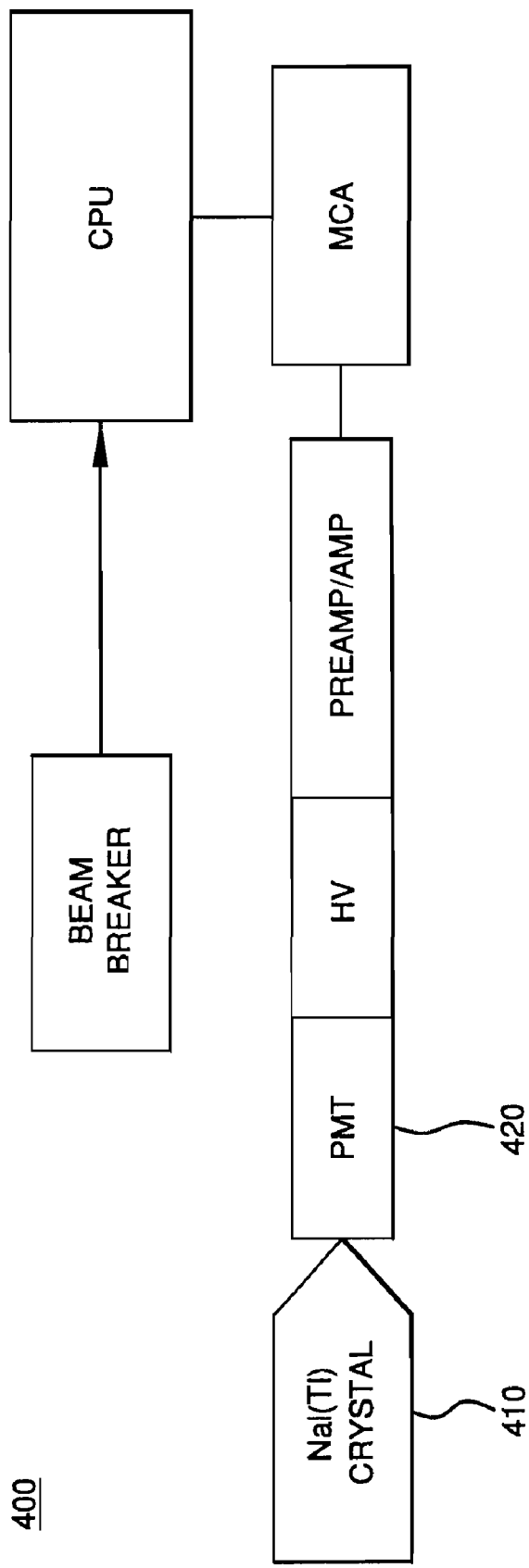
FIG. 4 illustrates a block diagram of a gamma ray detector according to an aspect of the present invention.

According to an aspect of the present invention, third detection channel 130 may be designed to detect the presence of and identify gamma radiation. Referring now also to FIG. 4, there is shown a block diagram of detector 400. As may be seen in FIG. 4, detector 400 may include a gamma ray sensor 410 and a converter 420. Gamma ray sensor 410 may take the form of a suitable device capable of converting incident gamma rays into a form capable of conversion into electrical signals. For example, sensor 410 may take the form of a crystal, such as NaI or Ge(Li), for example. In such a configuration, gamma rays may interact with a NaI crystal sensor 410.

The detection efficiency of NaI crystals may improve with increasing crystal volume and the energy resolution may be dependent on the crystal growth conditions. Higher energy resolution is essential in radioactive counting situations where a large number of lines are present in a gamma ray spectrum.

A NaI crystal may output photons proportional to the gamma ray energy incident thereon. The height of the electronic pulse produced in a Ge(Li) detector also may be proportional to gamma ray energy.

With appropriate calibration, NaI and Ge(Li) detector systems may be used to determine the energies of gamma rays from other radioactive sources.

Converter 420 may be used to convert the output photons into electrical signals. Converter 420 may take the form of a photomultiplier tube, for example.

Other sensors 410 may be used within the detector of the present invention, and such other sensors may require use of alternative converters 420. Functionally, the combination of sensor 410 and converter 420 may convert incident gamma rays into a usable electrical signal that may be proportional to the energy of the incident gamma ray.

An electrical signal produced by the detector of the present invention may be filtered and amplified as would be evident to those possessing an ordinary skill in the pertinent arts. The electrical signal may be read into a processor, such as a computer, utilizing one or more channels on a multi-channel analyzer. It may be advantageous to use a common filtration and amplification system so that multiple channels may be calibrated in common. The number of channels used on the multi-channel analyzer may factor into the resolution of detector 400. For example, as is known to those possessing an ordinary skill in the pertinent arts, quantization effects may result in sampling data and sampling at lower than the nyquist frequency will produce data that may not be resolved into the component energies as necessary.

A multi-channel analyzer, as would be evident to those possessing an ordinary skill in the pertinent arts, may have a few channels, or up to thousands of channels. For the sake of discussion a 16K multi-channel analyzer may be used, providing approximately 16K channels for the gamma detector and at least one channel for each of the neutron and x-ray detectors.

Figure 5A:
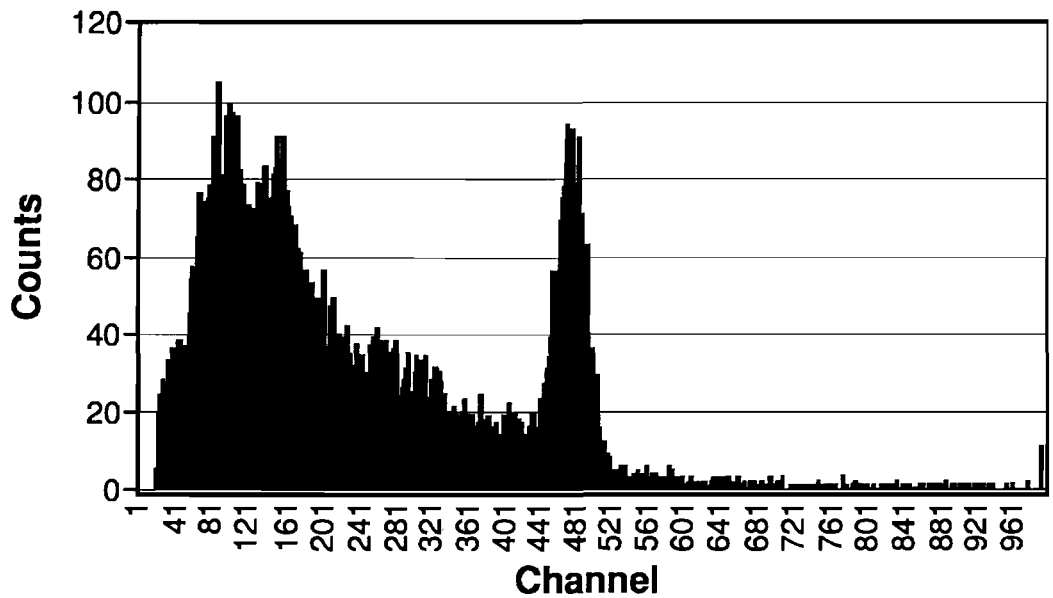
FIG. 5A illustrates a set of sample data as may be detected by the gamma ray channel according to an aspect of the present invention.
Figure 5B:
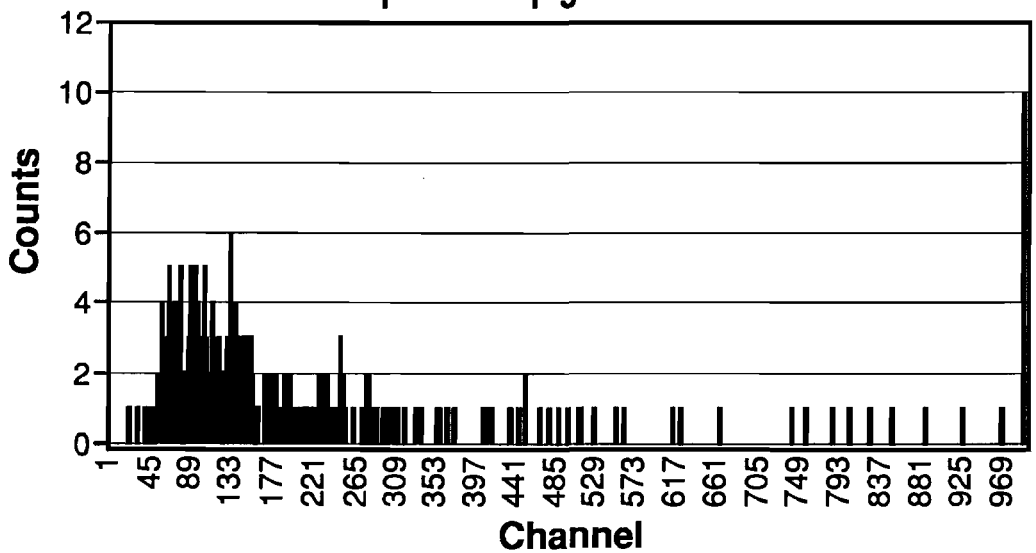
FIG. 5B illustrates a set of sample data as may be detected by the gamma ray channel according to an aspect of the present invention.
Figure 5C:
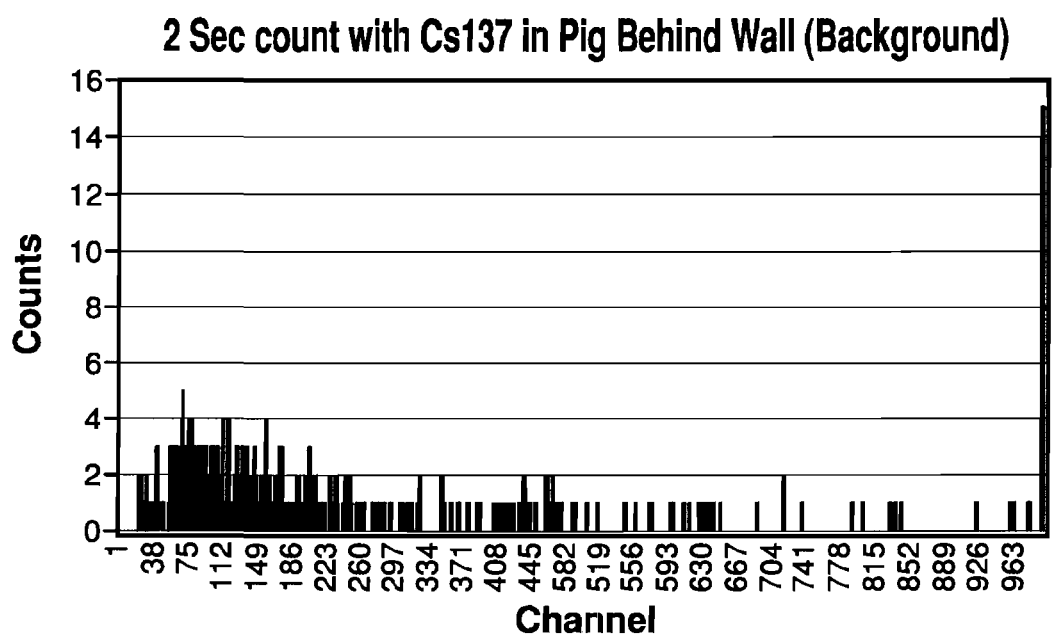
FIG. 5C illustrates a set of sample data as may be detected by the gamma ray channel according to an aspect of the present invention.

Referring now to FIGS. 5A-C, there are shown a spectra and baseline as may be detected by the gamma ray channel according to an aspect of the present invention. As may be seen in FIGS. 5A-C, a given gamma emitting material releases a constant amount of energy. Thus, for example, Cs 137 may produce channel peaks at approximately 81, 161, and 481 channels, by way of non-limiting example only. Each gamma source, similarly having a unique signature, may allow for the corresponding identification of sources.

The present gamma detection function may also be designed to enhance low level measurements. In particular, low level detection may occur at the level of approximately 10 .mu.Rem/hr for a 1 second integration time. This low level detection may be in the range 5-15 .mu.Rem/hr for a 1 second integration time—with background in approximately the 4 .mu.Rem/hr for a 1 second integration time range. Enhancement of the crystal, including size optimization, may increase the low level sensitivity to gamma detection.

Figure 6:
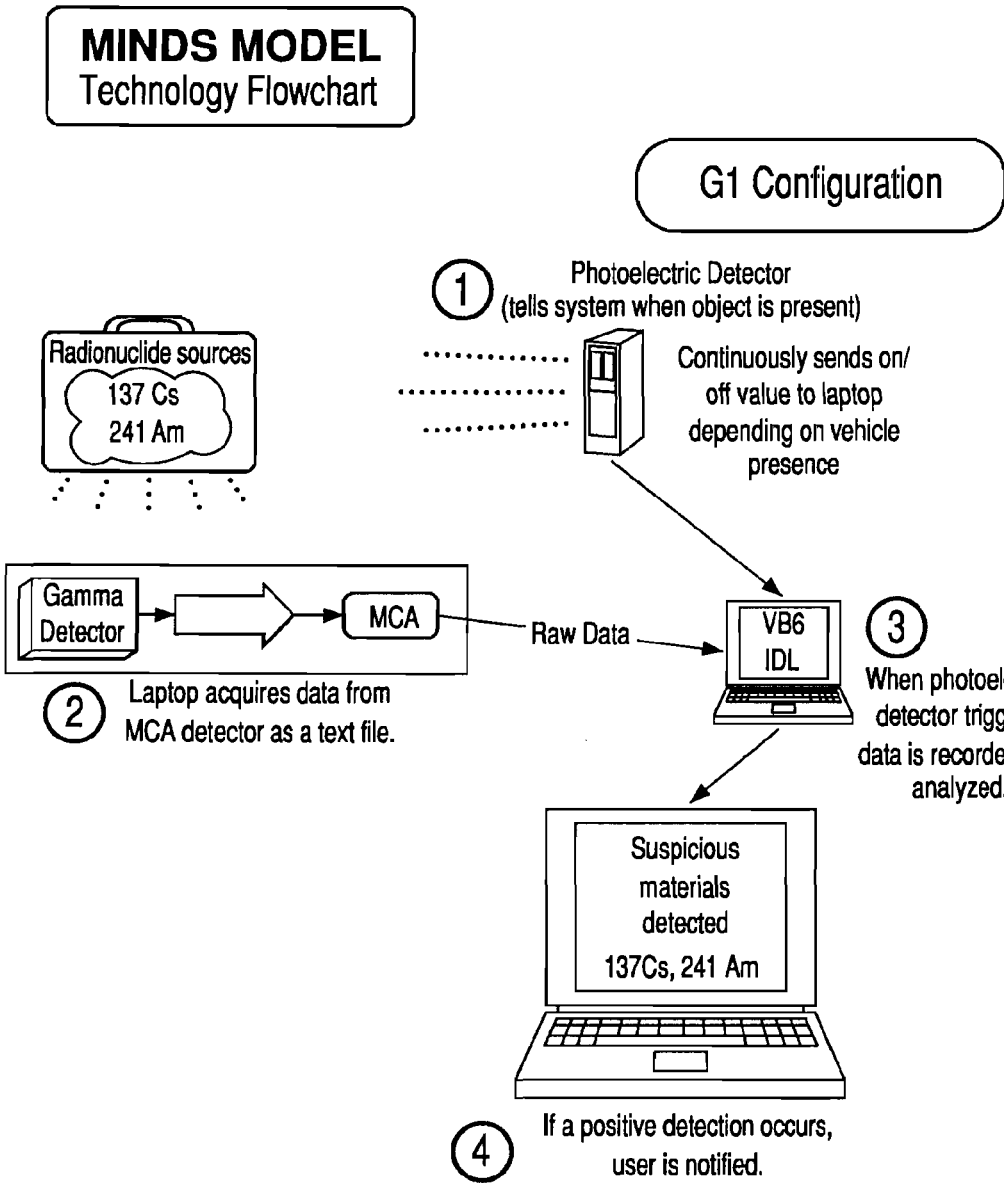
FIG. 6 illustrates a configuration according to an aspect of the present invention.

The configuration of the present invention provides for rapid identification of emissions and is linked to software. Referring now to FIG. 6, there is shown a configuration according to an aspect of the present invention. As may be seen in FIG. 6, a computer acquires data from the multichannel analyzer as discussed hereinabove. The raw data is transmitted to a processor. In addition to the raw data, an additional set of data from a photoelectric detector may be logged. The photoelectric detector identifies to the system when an object is present. This detector continuously sends an on/off value to the processor depending on the target presence. For example, if vehicles are to be monitored at a toll booth, the photoelectric detector may monitor the presence of a vehicle to be monitored. This may provide the system with information to determine which vehicle contains the emission of interest. Further, the system may be designed to record and analyze data when the photoelectric detector is triggered, thereby providing data only when a target is positioned as desired.

Figure 7:
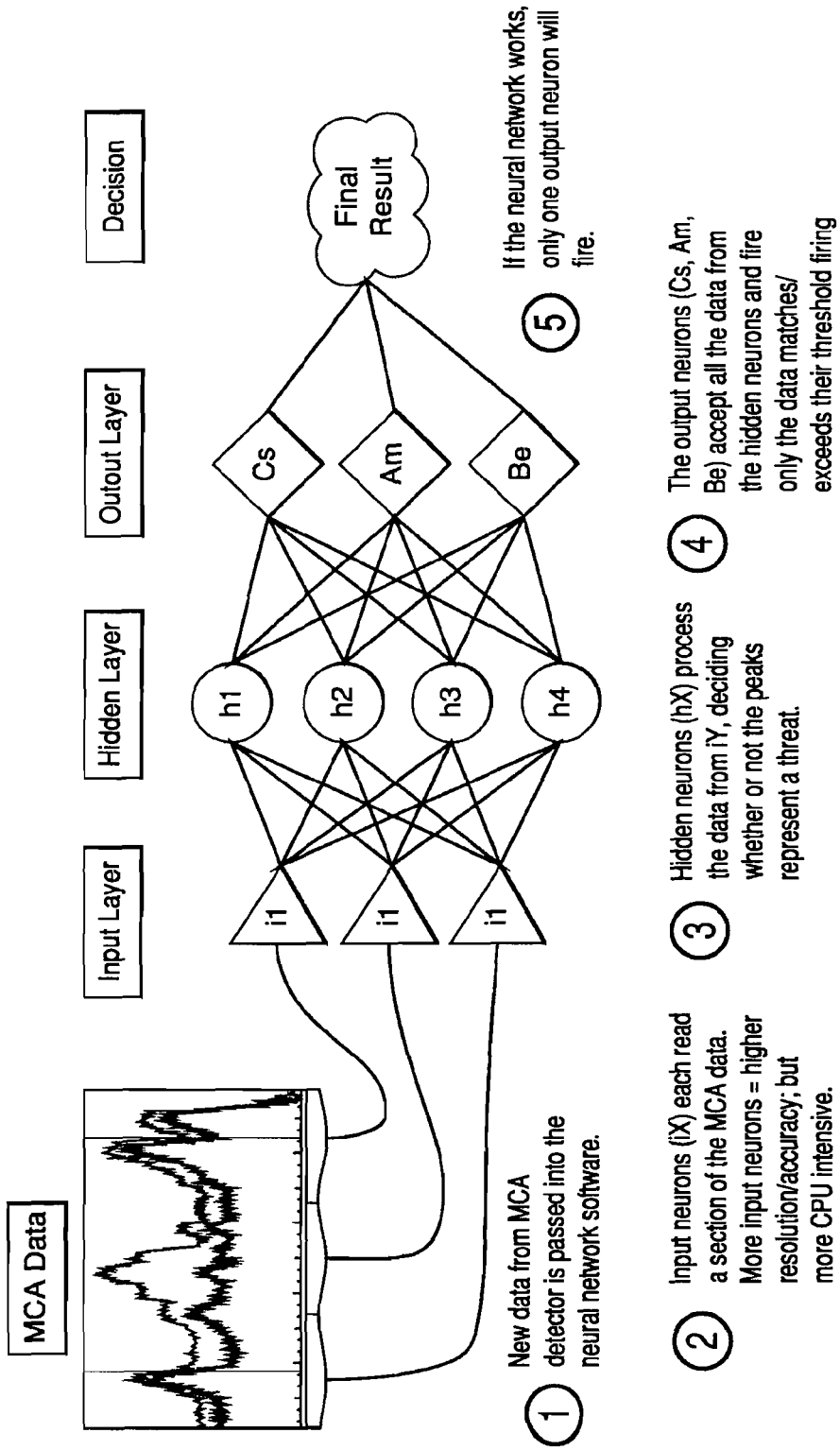
FIG. 7 illustrates a neural networking configuration of the software according to an aspect of the present invention.
Figure 8:
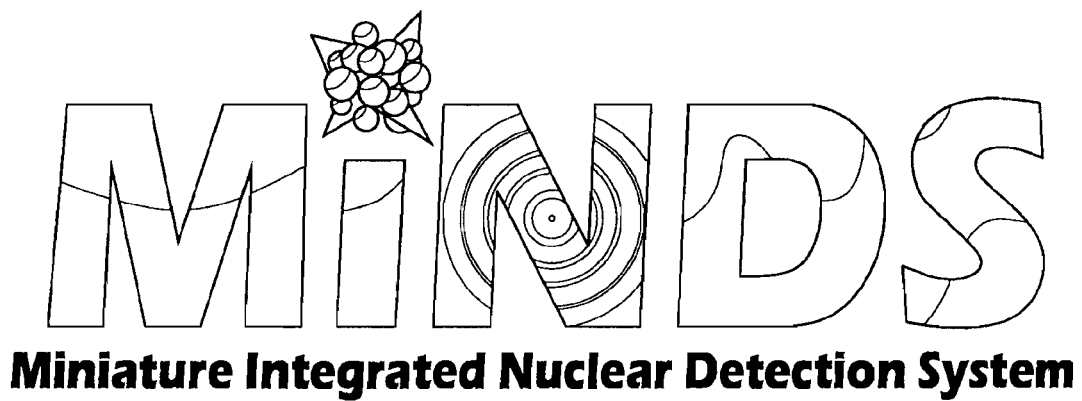
FIG. 8 shows a screen shot of the main system screen according to an aspect of the present invention.

Referring now to FIG. 7, there is shown a neural networking configuration of the software according to an aspect of the present invention. According to an aspect of the present invention, the present software may take the form of advanced neural networking. Such a configuration may input the data from the multi channel analyzer (MCA) into the software system. As shown in the configuration of FIG. 7, input neurons read a designated portion of the input MCA data. Because of the quantization effect which may occur, the greater the number of input neurons, the higher the resolution and accuracy that may be achieved, but greater processing is required. If an input neuron detects a peak, it fires. A second stage of neurons, often called hidden neurons, may process the data from the input neurons (including whether the input neurons fired or not). This processing may result in determining if the peaks detected by the input neurons represent a threat. Output neurons may be linked to the second stage of neurons, and may represent particular elements that may be detected. The output neurons may fire when the second stage of neurons detect the presence of a given element associated with a particular output neuron. For example, if the second stage neurons determine the presence of cobalt 90, the output neuron associated with cobalt 90 may fire because the output neuron corresponding to cobalt 90 has exceeded its threshold condition. Ultimately, in the presence of a single isotope, a single output neuron may fire, namely the output neuron corresponding to the identity of the isotope detected. In such a configuration, the software may learn or adapt to conditions, such as weather, temperature, and solar. Further, the software may be able to detect an isotope even in the presence of systematic shifts in the data detection. Knowing that an isotope may have a signature that has a ratio between channels of 2:1 for example, wherein the channels are 200 channels apart, may allow the software to shift the incoming data when comparing to the known parameters. Software in this configuration provides greater matching abilities and may reduce the number of false positives or false negatives.

Additional software configurations may be implemented, including plotting the counts per channel on the MCA and comparing to known isotope curves to provide the identity of the isotope, or to provide a match to a preselected library of isotopes.

Further, the software may be varied accordingly, to be as sensitive or as insensitive as necessary, based on the radiation type or types to be searched for, and the distance between the potential radiation source and the detectors.

There are literally thousands of radionuclides presently known to exist. The present invention may include reference spectra of all such known radionuclides, or any subset of radionuclides as determined by a user. A consequence of having a large number of reference waveforms in a library resident in a storage device employed in the apparatus and methods of the invention, however, is to increase the analysis time required to make a decision. In addition, not all radionuclides are currently considered to be relevant or threatening. In the interests of providing a device that may be implemented in the field, certain nonlimiting embodiments of the present invention may restrict the identities of relevant and/or threatening radionuclides to a relatively smaller subset.

Many radionuclides can be identified by examining the characteristic gamma rays emitted in the decay of the radioactive parent nucleus. For example, two characteristic gamma rays occur in the decay of the radionuclide Na 22. The Na 22 decay occurs by one of two independent mechanisms. In each of the two beta decay branches, a positron and a neutrino are emitted, and the net nuclear charge changes from $Z=11$ to $Z=10$. In one decay branch, the Na 22 ground state is stable; however, the first excited state of Na 22 at about 1.275 MeV decays with a lifetime of 3.7 ps in the gamma decay process, which gives rise to a characteristic gamma ray with energy of about 1.275 MeV. The positrons slow rapidly in the radioactive source material and disappear in the annihilation process, producing two characteristic 0.511 MeV annihilation gamma rays. In the other decay branch, an atomic electron may be captured by the Na 22 nucleus in the reaction, and a monoenergetic neutrino may be emitted. The electron capture process populates only the first excited state of Na 22 at 1.275 MeV and therefore characteristic 1.275 MeV gamma rays result. Annihilation gamma rays at 0.511 MeV are not produced in electron capture because positrons are not created.

For example, for Co 60 spectra, two main gamma ray peaks above 1 MeV are evident. In analyzing the spectra, a centroid of the energies peaks including the associated uncertainties may be apparent. Comparison of the data with known energy level diagrams, as would be evident to those possessing an ordinary skill in the pertinent arts, may thus be performed. A source may be identified by comparing the centroids of the energy peaks with a chart of the nuclides and/or a table of isotopes.

Referring now to FIGS. 8-11, there are shown screen shots associated with the software of the present invention. As may be seen in FIG. 8, a start-up and all systems go screen is shown. This screen enables a operator to determine if the system is working and, if so, if the present invention is functioning properly. FIGS. 9-11 show alert pages for various emission. For example, in FIG. 9, there is shown a screen shot associated with a Cs 137 detection. In addition to informing the user of a positive detection, the threat level is provided (which is high for Cs 137), and the half-life of the detected isotope may be provided (which is 30 years for Cs 137). Also provided is a timestamp of the alert time and date. Similarly, as may be seen in FIG. 10, there is shown a screen shot of a detected Am 241 alert page. The threat level for Am 241 is defined as medium, and the page conveys that Am 241 has a 432.7 year half-life. Further, the alert is time stamped for ease of reference. As may be seen in FIG. 11, there is shown an alert page for the alert of Co 60. Co 60 has a high threat level and a half-life of 5.3 years. Again the time and date stamp is provided. Additional information may be provided and the present screen shots show the features of an exemplary embodiment of the present system. Other features may be provided via screen shots, such as, in embodiments wherein one or more detectors are used, or wherein one or more detectors are given certain fields of view or certain assigned angles of a field of view, providing using the screen shots information on distances of radionuclides from the one or more detectors, and amounts of radionuclides within the view field of the one or more detectors.

Figure 12:
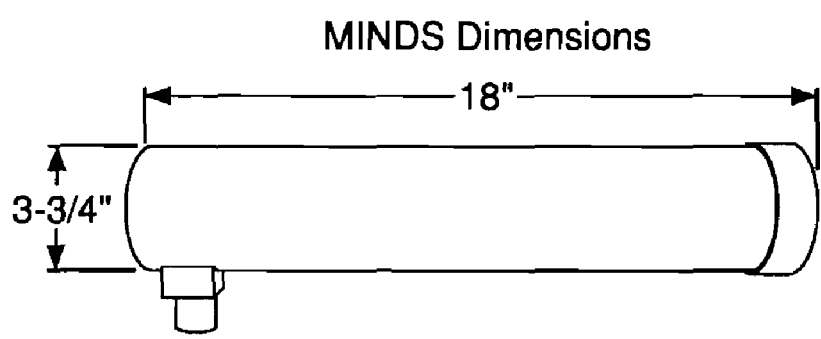
FIG. 12 illustrates a housing according to an aspect of the present invention.

Referring now to FIG. 12, there is shown a housing according to an aspect of the present invention. As may be seen in FIG. 12, the present invention may be designed in a relatively small and light configuration. While many other housing and storage mechanisms may be employed, this exemplary housing is illustrated solely for the purpose of demonstrating the size and weight benefits of the system of the present invention. The housing may be made from a suitable material or materials. According to an aspect of the present invention, a PVC enclosure may be utilized. Such a configuration may include an internal metal shield to prevent or limit electrical and environmental disturbances. Aluminum enclosures may also be utilized. Such a configuration may also include an internal metal shield. Kevlar or other protective elements may also be used. As is known to those possessing an ordinary skill in the pertinent arts, products such as Kevlar may be utilized to provide high strength protection in a light weight configuration. The enclosure of the present invention may be designed to withstand full immersion in water. This may be accomplished by using o-ring designs, for example. Additionally, a weather-proof design may be beneficial to provide independence or minimize reaction to the surrounding environment. The present invention may be designed to work over a substantial temperature range. For example, according to an aspect of the present invention, the system described herein may be designed to operate from −25 to +55 degrees C.

An advantage of the self-contained detecting portion of the present invention is that it may be installed with ease in any location whereat its use is desired or recommended. By way of a nonlimiting example, a housing incorporating a detector is shown in FIG. 12. The housing may have a diameter of approximately 4.5 inches and a length of approximately 17 inches. The housing may contain system 100 including first detection channel 110, second detection channel 120 and third detection channel 130. Processing 140 may be contained within, or coupled but not contained within, the housing as determined by size and weight requirements, and this processing may be for one or more of the channels for interpreting and analyzing the data from that one or more channel. The housing as shown, and similar embodiments of a housing, may accommodate at least three detectors; nonlimiting examples of which may include a NaI detector, a cadmium-zinc-telluride detector, and a neutron detector based either on BF3 or He3 as the active element. A cable may exit the housing shown in FIG. 12 and electrically connect to a processor suitable for performing the processing function described hereinabove. Similarly, in environments allowing for such a connection, a wireless connection may be employed between the detector and the processing, and/or between the processing and one or more monitoring locations. For example, a wired or wireless connection may allow for a monitoring of multiple sites having a detector and processing from a single monitoring location.

Figure 13:
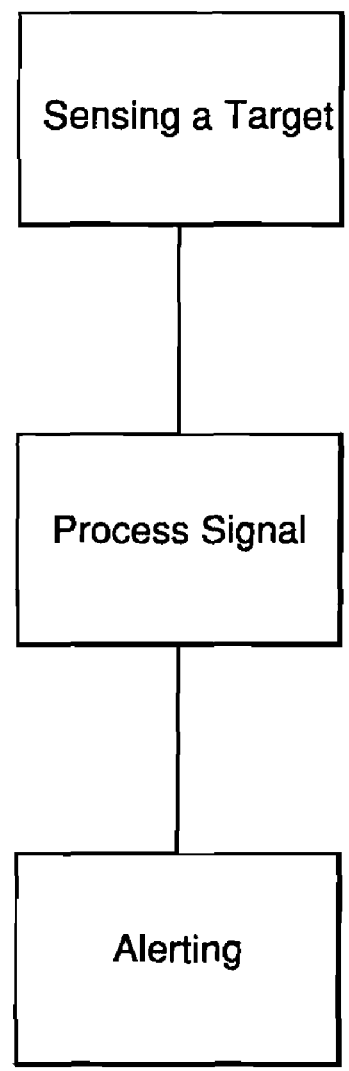
FIG. 13 is a flow diagram of a method of detecting radionuclides according to an aspect of the present invention.

Referring now to FIG. 13, there is shown a method of detecting radionuclides according to an aspect of the present invention, such as in accordance with the exemplary embodiments of FIGS. 1 through 12 hereinabove. Method 1300 may include sensing a target using one or more suitable detectors. Method 1300 may also include processing the signal resulting from the detection of the target in order to detect the presence of or identify the type of radionuclides present. Method 1300 may also include an alert responsive to the detected or identified radionuclides in the present target.

According to yet another aspect of the present invention, the incorporation of sophisticated algorithms may bring to fruition the true potential for hyper-accurate, cost-effective NaI-based nuclear detection technologies. There are several advantages in using NaI Scintillation Hardware in the detection of radionuclides. For example, as compared to other detection technologies, Na! crystals may be robust, highly sensitive, and available for relatively low costs. Additionally, no refrigeration of the scintillating material may be necessary, as is typically the case for semiconductor (Germanium-based) detectors. Therefore, highly sensitive NaI detectors robust to a wide range of real world environmental operating conditions may be fabricated within relatively lower budgets.

Such application of computer algorithms to automated radionuclide identification is a unique and innovative shift in the perception of the task of spectroscopy. For example, instead of merely identifying an idealized set of isolated peaks in the gamma ray spectrum of a specific radionuclide, the characteristic signal produced by a certain scintillating detection apparatus in the presence of a specific radionuclide, including noise and scattering, may specify an overall spectrum pattern that may be unique in its own right. This recasting of the problem may highlight the role that artificial intelligence (AI) algorithms or systems may play in its resolution. As used herein, an artificial intelligence system may provide hyper accurate pattern recognition of spectral data.

Artificial intelligence codes may include two distinct algorithms or sets of algorithms, such as "training" algorithms and "classification" algorithm, for example. The training algorithm may be fed with a large number of multi dimensional data samples, such as gamma ray spectra, for example, which may have been pre labeled with the desired binary classification. Such labeling may signify whether a specific radionuclide in the detection library is present or absent.

The training algorithm may then analyze this data to "learn" the most efficient and reliable rule for distinguishing positive from negative examples. The output of the training algorithm may be a classification algorithm that may further be used to classify input samples, or spectra, in real-time.

According to an aspect of the present invention, radionuclide identification system and method may include the following steps. First, one binary classifier may be trained for each radionuclide in a desired library, using a set of sample spectra that may be labeled with the presence or absence of that radionuclide's signature. Such sample spectra sets may preferrably be large, but there need not be any requirement for a predetermined minimum number of such samples. These spectra may represent a sufficient array of signal strengths, background noise levels, and/or combinations of the presence and absence of other radionuclides. After a classifier is trained for each of the library elements, real time identification of each spectrum from a gamma sensor may be obtained by evaluating the classifier for each radionuclide in the library.

The efficiency of the classification algorithm may be such that a single spectrum may be tested using computing hardware against a large library of radionuclides in a fraction of a second. In this way the presence or absence of any combination of library resident radionuclides in the spectral record, whether embedded or not, may be determined.

This novel approach may capitalize on the fact that artificial intelligence based systems do not 'see' spectral data in the same way as does the human eye, or its corollary conventional peak-fitting algorithms. As described herein, artificial intelligence systems may be capable of analyzing the data with sufficient acuity as to render the increased resolution of germanium detectors unnecessary for many applications. Additionally, artificial intelligence based systems, may be fully capable of dealing with the problem in which a particular radionuclide's peaks may be masked by peaks of other nuclides in the same energy range. For example, in what would be a very difficult judgment call for the human eye or its software corollary, the present invention may automatically select and weigh the most significant global features of the spectra to enable accurate identification of all library-present radionuclides.

The nature of the feature selection and weighting done within the context of the artificial intelligence based system may be further illustrated by considering exemplary artificial intelligence frameworks, such as Support Vector Machines (SVMs). Support-vector machine training systems may comprise a geometric framework, in that they may define a way to partition the high dimensional space of training samples using a hyperplane that may provide the widest 'margin' between positive and negative samples. By doing so, SVM training systems effectively search for the features of the input space that differentiate the positive from negative examples by the widest margin, thereby discovering the important or essential dimensions that differentiate the two categories of samples. For example, if a gamma ray spectrum consists of 1024 integer data points corresponding to energy levels, the SVM training procedure for a particular radionuclide may examine a set of points occupying 1024 dimensional space, each point consisting of one spectrum in the training set. This procedure may converge to a hyperplane that optimally "slices" the 1024-dimensional space of spectra into two halves with all positive samples on one side and all negative examples on the other. Further to this, in the more difficult case where a perfect separation may not be possible, the training system may work to minimize the weighted error of samples that are placed on the side of the hyperplane opposite to their true classification.

After training is completed, any future spectra may be classified in real time by operation of determining on which side of the trained hyperplane the spectra may fall.

In this way, the training system may find precisely those spectral features that indicate the presence of the designated library-resident radionuclide and, on the negative side, may learn to screen out any 'deceptive' features that may be found in other radionuclides, such as radionuclides with peaks in the same region, for example. Features not noticeable to the human eye or its peak-fitting software corollary, such as a series of small variations in relative peak strengths, may thus become obvious to the trained SVM system. Even in the case when the spectra of two distinct radionuclides have a peak in the same energy band, the support-vector training system may be capable of finding and identifying features in its representation that separate them by a great distance, which may result in more accurate and empirically verifiable identification.

The inherent capability of artificial intelligence based systems of the present invention may be further enhanced by normalization techniques, as well as by projecting the data into a higher dimensional feature space that accentuates the desired distinguishing features. Furthermore, the system may include traditional peak-fitting algorithms, which may be run in parallel. Heuristic decision logic may be employed to compare the results of the multiple and/or independent algorithms, which may produce an ever higher level of classification accuracy.

The capabilities of artificial intelligence based systems to identify radionuclides with overlapping or hidden peaks, may be further illustrated based on the following set of examples.

According to an exemplary embodiment of the present invention, the isotopes Barium-133 and Iodine-131 may provide an example of two common radionuclides that have energy peaks near each other in the gamma ray spectrum, with peaks at energies 302.8 and 284.3 keV, respectively. The average peak width for these elements using a NaI crystal is approximately 40 keV. The spatial distance between these two peaks is small enough that they may not be distinguishable to peak fitting algorithms or to the unaided human eye. Furthermore, when Ba-133 and I-131 are both present, only one distinct peak may be visible in the gamma-ray spectrum.

However, there are more significant differences between the spectra of Ba-133 and I-131 in the lower energy channels, especially below 152 keV. In order to more stringently test the capabilities of the artificial intelligence based system, as well as to more closely model the real world situation of greater background noise in the lower channels, the spectra used in the provided examples was "thresholded" such that no energies below 152 keV were considered. Such thresholding effectively eliminated these other distinguishing features and made the analysis in the provided examples considerably more difficult.

However, these spectra were analyzed with the SVM artificial intelligence based system and found them able to automatically compensate for the above mentioned similarities, and further produced a highly efficient procedure to distinguish between Ba-133 and I-131. In this case, two SVM classifiers were trained separately, one for Ba-133 and one for I-131, using training data sets consisting of spectra synthesized for each of the two radionuclides at various intensity levels, using the characteristics of a NaI detector. Then, for testing purposes, additional spectra were generated for each element at different intensities than the training spectra.

As shown in FIGS. 14 and 15, graphs of two independently generated test spectra for Ba-133 and I-131 have been depicted, with the results of both the peak fitting and artificial intelligence based system labeled on the graph.

The result of the artificial intelligence based system is displayed in the text below the graph. The peak fitting result is shown by the vertical line through the center of the peak with the label at the top. Even though the actual element present is I-131, the peak fitting algorithm has here been instructed to locate Ba-133 in this energy band, and has no means to avoid a false identification.

Conversely, the SVM system may correctly identify the radionuclides in both cases. Note that the SVM algorithms may first normalize the data that they process, therefore may discriminate using relative peak heights and do not depend upon absolute intensity. Through the SVM training procedure, the code has automatically "learned" to search for the subtler features that differentiate the spectra of the two radionuclides.

Figure 16:
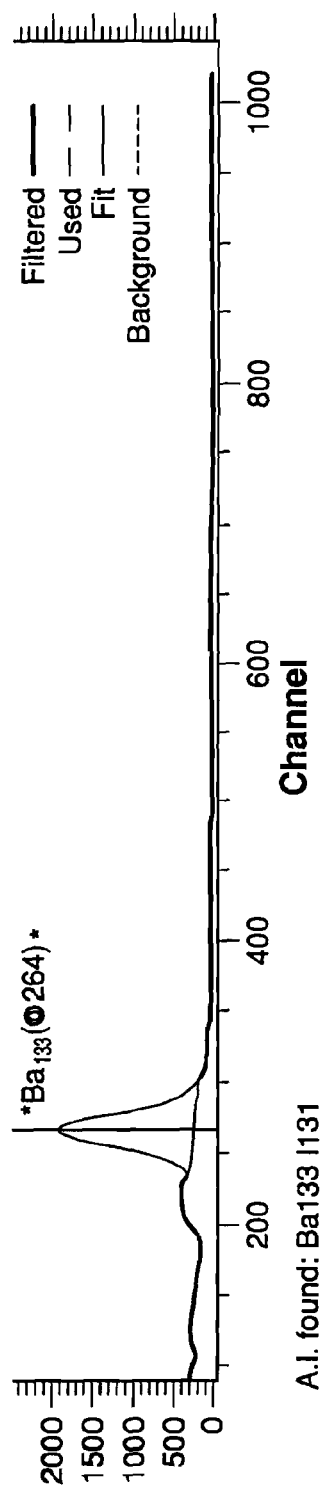
FIG. 16 is a graph of generated test spectra for Ba-133 and I-131.

In another example, a spectrum was constructed that contained the signatures Ba-133 and I-131, present at similar levels of strength. As shown in FIG. 16, both radionuclides are successfully found using the artificial intelligence based system, though to the human eye it is extremely difficult to tell which of the two elements are actually present. Here the classifiers for Ba-133 and I-131 were not trained on any spectra containing a combination of radionuclides. Nevertheless, the system learned the features that distinguish Ba-133 and I-131 to a level that both classifiers may consistently recognize their respective element's signature within the combination spectrum.

Figure 17:
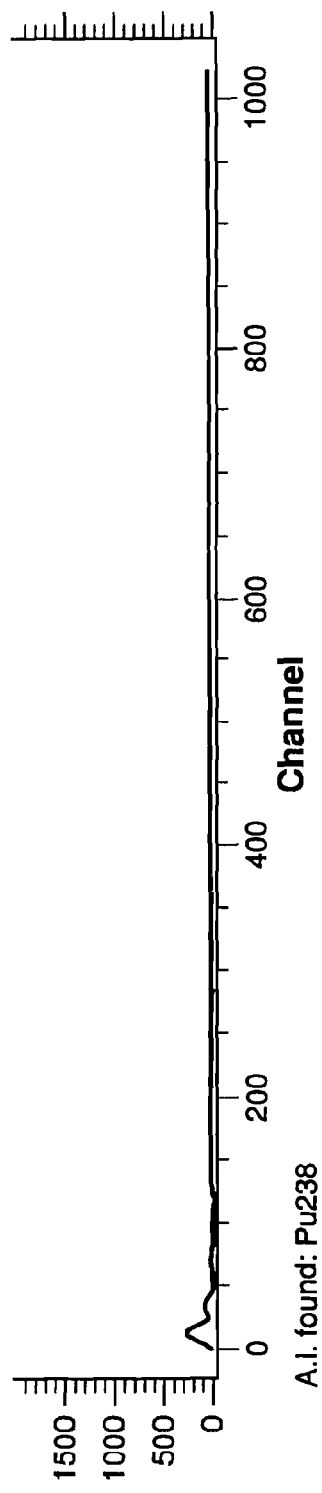
FIG. 17 is a graph of generated test spectra for Pu-238.
Figure 18:
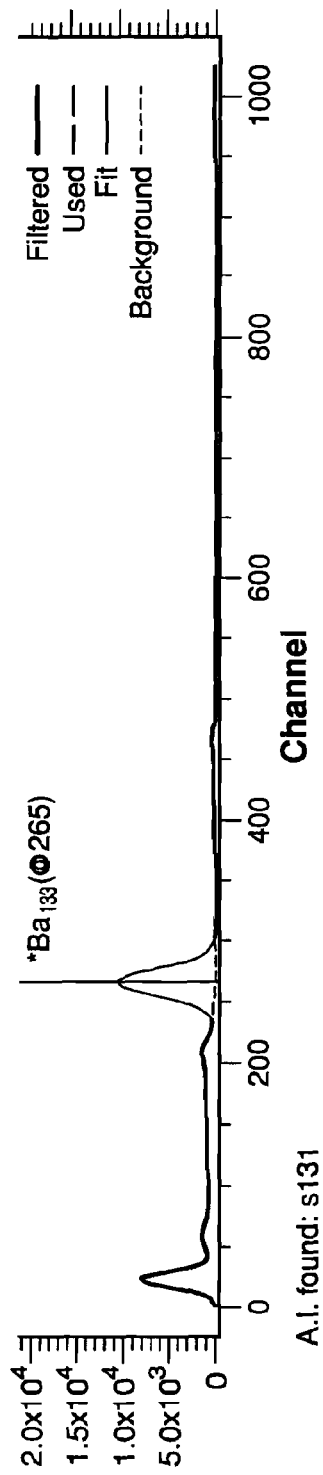
FIG. 18 is another graph of generated test spectra for I-131.
Figure 19:
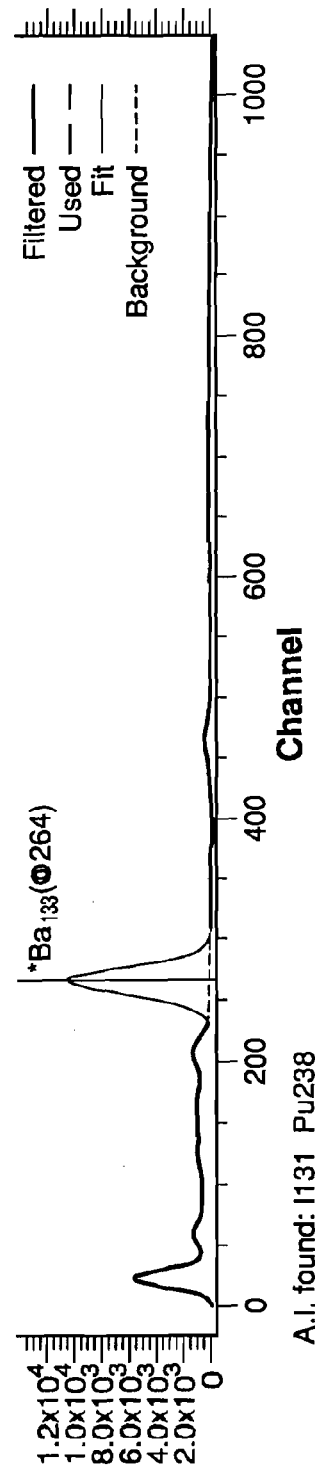
FIG. 19 is a graph of generated test spectra for Pu-238 embedded in I-131.
Figure 20:
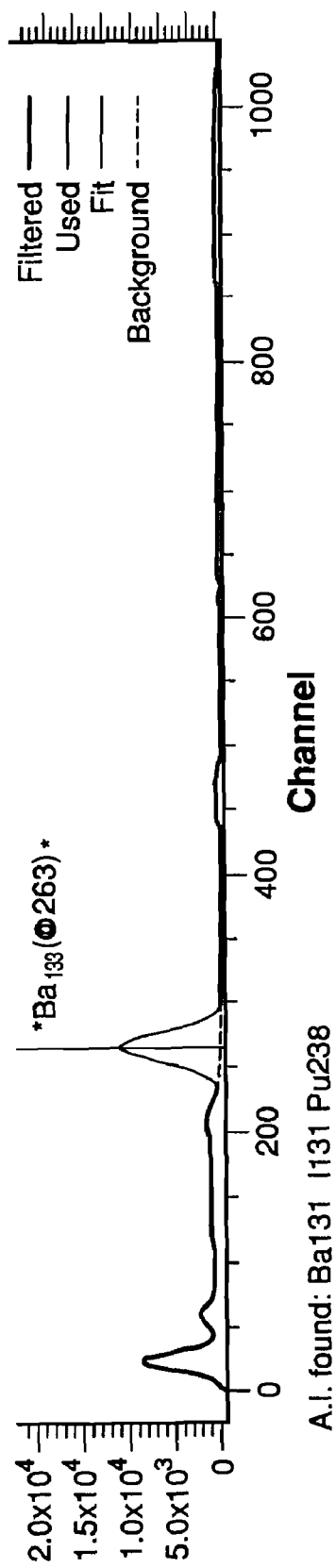
FIG. 20 is a graph of generated test spectra for Pu-238 embedded in I-131 and Ba-133.

In yet another example, a radionuclide of low intensity has its spectrum peaks almost entirely "buried" by the presence of other radionuclides. This could happen if it were attempted to disguise the presence of a radionuclide classified as a threat material by the presence of non threat radionuclides. For this experiment, additional spectra were generated containing Plutonium-238 (Pu-238) in addition to the Ba-133 and I-131 used above. Pu-238 will characteristically produce a gamma ray spectrum with much smaller peaks than either of the other two radionuclides. In the combination of these elements, the distinguishing features of the Pu-238 spectra are virtually invisible to the human eye or conventional peak-fitting algorithms. However, the artificial intelligence based system of the present invention was able to correctly identify the presence of any combination of all three radionuclides in real-time, as shown in FIGS. 17-20. In FIG. 17, Plutonium-238 spectra was identified; in FIG. 18, Iodine-131 spectra was identified; in FIG. 19, Plutonium-238 was detected embedded in Iodine-131; and in FIG. 20, Plutonium-238 was found embedded in Iodine-131 and Ba-133.

Those of ordinary skill in the art will recognize that many modifications and variations of the present invention may be implemented without departing from the spirit or scope of the invention. Thus, it is intended that the present invention cover the modification and variations of this invention provided they come within the scope of the appended claims and their equivalents.

The invention claimed is:

1. A detector for detecting the presence of suspect radionuclides in a target, said detector comprising:

a first detection channel for a first detecting neutron emissions in the target and for providing a first output in accordance with the first detecting;

a second detection channel for a second detecting x-ray emissions in the target and for providing a second output in accordance with the second detecting;

a third detection channel for a third detecting and an identifying of gamma emissions in the target and for providing a third output in accordance with the third detecting and identifying;

a processor electrically coupled to each of said first, second, and third detection channels, said processor for receiving the first, second and third outputs, and comprising at least a first neuron layer for receiving at least a portion of the first, second and third outputs, a second neuron layer for receiving first processed data from the first neuron layer and that compares peaks in the first processed data to a plurality of radionuclide signatures, and a third neuron layer for receiving second processed data from the second neuron layer and the compares peaks in the second processed data to one or more adjusted radionuclide signatures;

and, wherein said processor determines if at least one suspect radionuclide is present in the target based on an output of either the first or third neuron layer and provides an alert when the suspect radionuclide is present in the target; and wherein said processor determination occurs when said processor is exposed to a lower level of detection of about 10 .μRem/hr for a period of about one second.

2. The system according to claim 1, wherein said system identifies the at least one suspect radionuclide in real-time.

* * * * *

UNITED STATES PATENT AND TRADEMARK OFFICE
CERTIFICATE OF CORRECTION

| | | |
|---|---|---|
| PATENT NO. | : 7,877,340 B2 | Page 1 of 1 |
| APPLICATION NO. | : 12/761717 | |
| DATED | : January 25, 2011 | |
| INVENTOR(S) | : Gentile et al. | |

It is certified that error appears in the above-identified patent and that said Letters Patent is hereby corrected as shown below:

Column 1, lines 19-23 - change "The inventions described herein have been developed for, pursuant to, or with the assistance of, the United States government. These inventions may be manufactured, used and licensed by or for the United States government for United States government purposes." to -- This invention was made with government support under Grant DE-AC02-76CH03073 awarded by the Department of Energy. The government has certain rights in this invention. --

Signed and Sealed this
Eighth Day of March, 2011

David J. Kappos
*Director of the United States Patent and Trademark Office*